(12) United States Patent
Harmouch et al.

(10) Patent No.: US 10,619,705 B2
(45) Date of Patent: Apr. 14, 2020

(54) BELT MEANS AND SYSTEM FOR CONSTRUCTING A BELT MEANS

(71) Applicant: Schaeffler Technologies AG & Co. KG, Herzogenaurach (DE)

(72) Inventors: Alaa Harmouch, Rheinstetten (DE); Konstantin Braun, Rastatt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 171 days.

(21) Appl. No.: 15/572,516

(22) PCT Filed: Apr. 28, 2016

(86) PCT No.: PCT/DE2016/200199
§ 371 (c)(1),
(2) Date: Nov. 8, 2017

(87) PCT Pub. No.: WO2016/180413
PCT Pub. Date: Nov. 17, 2016

(65) Prior Publication Data
US 2018/0156311 A1 Jun. 7, 2018

(30) Foreign Application Priority Data
May 11, 2015 (DE) .......... 10 2015 208 640

(51) Int. Cl.
*F16G 5/18* (2006.01)
*F16G 13/02* (2006.01)
(Continued)

(52) U.S. Cl.
CPC .............. *F16G 5/18* (2013.01); *F16G 13/02* (2013.01); *F16G 13/06* (2013.01); *F16G 13/07* (2013.01); *F16H 9/24* (2013.01)

(58) Field of Classification Search
CPC . F16G 5/18; F16G 13/06; F16G 13/07; F16G 13/02; F16H 9/20; F16H 9/24
(Continued)

(56) References Cited

U.S. PATENT DOCUMENTS 5,176,584 A 1/1993 Ishida et al.
6,478,704 B1 * 11/2002 Greiter .................. F16G 5/18
474/215

(Continued)

FOREIGN PATENT DOCUMENTS

CN 1246585 A 3/2000
CN 1526974 A 9/2004
(Continued)

OTHER PUBLICATIONS

International Search Report for PCT/DE2016/200199; 2 pgs; dated Sep. 26, 2016 by European Patent Office.

*Primary Examiner* — Michael R Mansen
*Assistant Examiner* — Raveen J Dias
(74) *Attorney, Agent, or Firm* — Kevin L. Parks

(57) ABSTRACT

A plate link chain for a continuously variable transmission of a motor vehicle is provided. The plate link chain includes a plurality of link plates arranged parallel to a running direction of the plate link chain and each link plate includes an aperture formed therein. A plurality of pressure pieces are oriented perpendicular to the running direction and arranged in pairs to be received in the apertures of the link plates to form two joints in each link plate. The two joints in each link plate are supported by arcuate outer sections of the pressure pieces.

11 Claims, 2 Drawing Sheets

(51) Int. Cl.
*F16G 13/06* (2006.01)
*F16G 13/07* (2006.01)
*F16H 9/24* (2006.01)

(58) Field of Classification Search
USPC ........ 474/212, 215, 216, 217, 229, 230, 245
See application file for complete search history.

(56) References Cited

U.S. PATENT DOCUMENTS

| | | | | |
|---|---|---|---|---|
| 2002/0077205 | A1* | 6/2002 | Turner | F16G 5/18 474/242 |
| 2005/0209035 | A1* | 9/2005 | Oberle | B21L 15/00 474/206 |
| 2007/0010363 | A1* | 1/2007 | Pichura | F16G 5/18 474/215 |
| 2007/0238564 | A1 | 10/2007 | Simonov et al. | |
| 2007/0298922 | A1* | 12/2007 | Triller | F16G 5/18 474/215 |
| 2009/0181816 | A1* | 7/2009 | Ispolatova | B21L 11/00 474/229 |
| 2009/0181817 | A1* | 7/2009 | Huttinger | B21L 11/00 474/229 |
| 2011/0003658 | A1* | 1/2011 | Tada | F16G 5/18 474/148 |
| 2013/0109521 | A1* | 5/2013 | Nakazawa | F16G 13/06 474/228 |
| 2015/0267775 | A1* | 9/2015 | Ichijo | F16G 13/08 474/219 |
| 2016/0040761 | A1* | 2/2016 | Yasuhara | F16H 9/24 474/8 |

FOREIGN PATENT DOCUMENTS

| | | |
|---|---|---|
| CN | 1666038 A | 9/2005 |
| CN | 101069031 A | 11/2007 |
| DE | 102006046600 A1 | 5/2007 |
| DE | 102007023264 | 12/2007 |
| DE | 102008060578 A1 | 6/2009 |

* cited by examiner

BELT MEANS AND SYSTEM FOR CONSTRUCTING A BELT MEANS

CROSS-REFERENCE TO RELATED APPLICATIONS

This application is the U.S. National Phase of PCT Appln. No. PCT/DE2016/200199 filed Apr. 28, 2016, which claims priority to DE 10 2015 208 640.2 filed May 11, 2015, the entire disclosures of which are incorporated by reference herein.

TECHNICAL FIELD

The present disclosure relates to a belt means, in particular for a continuously variable transmission of a motor vehicle, which belt means is arranged in the torque flow between a first cone pulley pair of the transmission and a second cone pulley pair, having (i) pressure pieces which are oriented transversely with respect to the running direction of the belt means and, arranged in pairs, form in each case one joint, and (ii) link plates which are arranged parallel to the running direction and in which aperture-like openings are configured. The pressure pieces engage for the articulated connection of the link plates into the openings of the link plates in such a way that in each case two joints which are arranged behind one another in the running direction result per link plate, each of the two joints being supported by two arcuate outer sections of the respective outer pressure piece of the two joints on a corresponding edge section of the opening of the link plate. Furthermore, the disclosure relates to a system for constructing a belt means of this type, the system comprising a multiplicity of corresponding link plates and a multiplicity of corresponding pressure pieces.

BACKGROUND

A belt means of this type is known as a plate link chain from DE 10 2007 023 064 A1. The plate link chain has pressure pieces which are oriented transversely with respect to the running direction and, arranged in pairs, form in each case one joint, and link plates which are arranged parallel to the running direction and in which aperture-like openings are configured. Here, the pressure pieces engage for the articulated connection of the link plates into the openings of the link plates in such a way that in each case two joints which are arranged behind one another in the running direction result per link plate, each of the two joints being supported by in each case two arcuate outer sections of the respective outer pressure piece of the two joints on a corresponding edge section of the opening of the link plate.

DE 10 2006 046 600 A1 describes a belt means which is likewise denoted as a plate link chain. The belt means has cradle pieces which are oriented transversely with respect to its running direction and, arranged in pairs, form in each case one joint, and link plates which are arranged parallel to the running direction and in which aperture-like openings are configured. The cradle pieces engage for the articulated connection of the link plates into the openings of the link plates in such a way that in each case two joints which are arranged behind one another in the running direction result per link plate, each of the two joints being supported by two arcuate outer sections of the respective outer pressure piece of the two joints on corresponding edge sections of the opening of the link plate with corresponding radii of curvature. In addition to cradle pieces, the reference also mentions pressure pieces, and specifies various parameters for characterizing the link plates and cradle pieces or pressure pieces, such as a link plate thickness d, a web width s, a distance (denoted as pitch I) between the two joints in the at least one opening of a link plate, a pressure piece width w, a pressure piece height h, an inner web width b, etc. Furthermore, the reference specifies favorable ratios of some of the parameters to the link plate thickness d.

SUMMARY

The present disclosure describes a belt means and a system for making a belt means of this type, in which the belt means is subjected to a lower load during operation and therefore has a longer service life.

According to embodiments disclosed herein, it is provided in the belt means that the ratio $V_1$ of a distance (known as pitch I) between the two joints to a spacing a (determined perpendicularly with respect to the running direction) of the center points of circles which are adapted to the arcuate outer sections is $V_1 = I/a \leq 2.4$, and that the ratio $V_2$ of a pressure piece height h (determined perpendicularly with respect to the running direction) of the outer pressure pieces to the spacing a (determined perpendicularly with respect to the running direction) of the center points is $V_2 = h/a \leq 1.7$. The introduction of the new parameter a is decisive here. Component calculations in accordance with the finite element method (FEM) have shown that a low-load belt means can be characterized by the respective ratio of the known parameters pitch I and pressure piece height h with the newly introduced parameter a.

The ratios characterize a profile of a link plate/pressure piece arrangement, which profile has a higher section modulus and improved contact areas (between the link plate and the pressure piece).

In accordance with embodiments of the present disclosure, the contour of the pressure pieces has only convex radii.

In accordance with embodiments of the present disclosure, an introduction of force from the outer pressure pieces of the joints into the respective link plate takes place in respective regions of the edge sections which in each case lie outside the center point of the corresponding circle with regard to a longitudinal axis of the link plate. An introduction of force which lies as far to the outside as possible into the link plate therefore takes place.

In accordance with embodiments of the present disclosure, the radii of the two arcuate outer sections are of substantially identical magnitude.

Furthermore, it is advantageously provided that the arrangement of the link plates takes place in a two-link plate combination or in a three-link plate combination.

In accordance with embodiments of the present disclosure, the belt means has at least one securing device for captive securing of the pressure pieces and/or link plates. A plurality of safety devices of this type are usually provided. They can consist, for example, of pins which are welded onto the end regions of the pressure pieces.

In accordance with embodiments of the present disclosure, aperture-like openings are configured in the link plates, which aperture-like openings are configured in such a way that the pressure pieces can engage for the articulated connection of the link plates into the openings of the link plates in such a way that in each case two joints which are arranged behind one another in the running direction result per link plate. Furthermore, the link plates and pressure pieces are configured in such a way that each of the two joints which are constructed in this way can be supported by two arcuate outer sections of the respective outer pressure piece of the two joints on a corresponding edge section of the opening of one of the link plates.

Furthermore, the present disclosure relates to a continuously variable transmission for a motor vehicle, having a first cone pulley pair, a second cone pulley pair, and a belt means which is arranged in the torque flow between the first cone pulley pair and the second cone pulley pair. Embodiments disclose that the belt means is configured as an above-described belt means.

BRIEF DESCRIPTION OF THE DRAWINGS

The present disclosure will be described by way of example with reference to the drawings. In the drawings.

DETAILED DESCRIPTION

Figure 1:
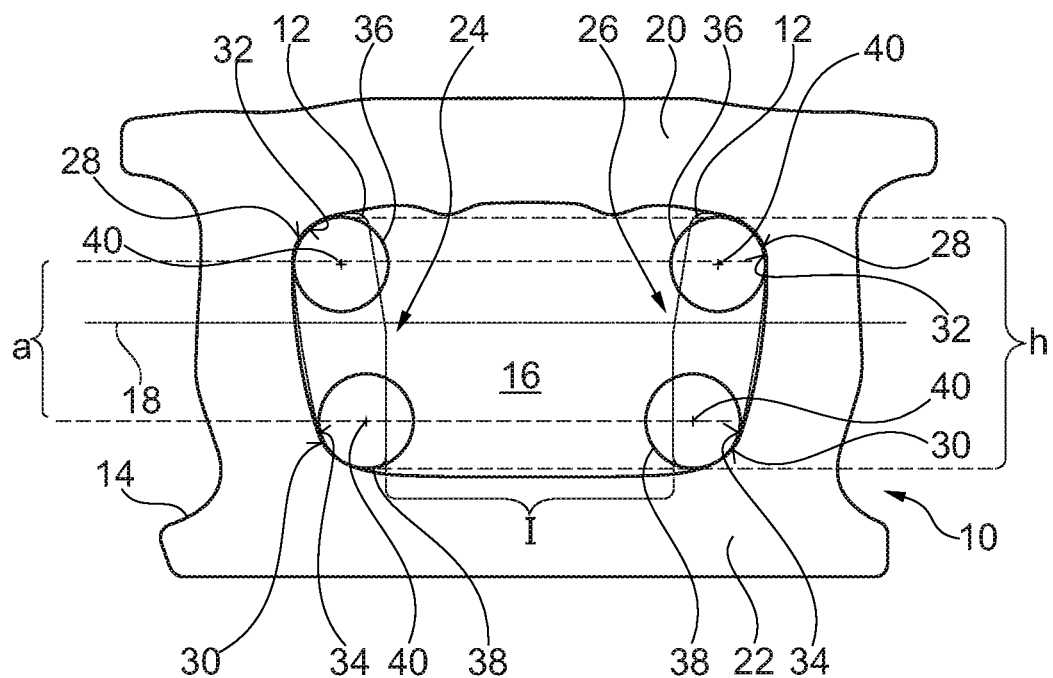
FIG. 1 shows a link plate/pressure piece arrangement of a belt means which is configured as a plate link chain, in accordance with one embodiment of the present disclosure in a sectional illustration.

FIG. 1 shows a link plate/pressure piece arrangement 10 comprising a plurality of pressure pieces 12 and a (connecting) link plate 14. The arrangement 10 is part of a belt means (not shown) which is often called a plate link chain. Here, the belt means comprises a multiplicity of pressure pieces 12 and link plates 14 which are often arranged in a two-link plate combination or in a three-link plate combination.

The link plates 14 have aperture-like openings 16, into which the pressure pieces 12 engage. Whereas the link plates 14, or the respective longitudinal axes 18 of the link plates 14, are oriented along a running direction of the belt means, the pressure pieces 12 are oriented transversely, in particular perpendicularly, with respect to the running direction or longitudinal axis 18. The openings 16 are of slot-like configuration and have longitudinal axes which run substantially coaxially or at least parallel to the longitudinal axis 18 of the respective link plate 14. This results in two link plate longitudinal brackets 20, 22 per link plate 14, wherein the link plate longitudinal brackets 20, 22 extend on both sides of the corresponding opening 16 parallel to the longitudinal axis 18.

The pressure pieces 12 are configured as cradle pressure pieces and engage in pairs into the openings 16 of the link plates 12, in order to form joints 24, 26, it being possible for the sequence of the link plates 12 to be repeated in a targeted manner transversely with respect to the running direction of the belt means, such that a corresponding link plate pattern results. The joints 24, 26 which are formed from in each case two (cradle) pressure pieces 12 are often also called cradle-type joints. As has already been mentioned above, the link plate arrangement of the link plates 14 can be selected, for example, in a two-link plate combination or in a three-link plate combination.

The (cradle) pressure pieces 12 of each of the joints 24, 26 which are arranged in pairs have sides which point toward one another and on which they roll on one another or on which they can move slidingly on one another, with the result that the link plates 14 are connected to one another in an articulated manner by means of the pressure pieces 12 which are configured in this way. Here, the pressure pieces 12 engage for the articulated connection of the link plates 14 into the openings 16 of the link plates 14 in such a way that in each case two joints 24, 26 which are arranged behind one another in the longitudinal direction 18 of the link plate 14 (which corresponds to the running direction of the belt means at the location) with in each case two pressure pieces 12 result per link plate 14. In each case only the outer pressure piece 12 is shown of each of the two joints 24, 26 which are shown in FIG. 1. Each of the two joints 24, 26 is supported during (traction) operation of the belt means by two arcuate outer sections 28, 30 of the respective outer pressure piece 12 of the joints 24, 26 on corresponding edge sections 32, 34 of the opening 16 of the associated link plate 14. The contour of the pressure pieces 12 has only convex radii, that is to say no concave curvatures.

The distance between the two joints 24, 26 which are arranged behind one another along the longitudinal axis 18 is usually called the pitch I, and is a known parameter for characterizing the link plate/pressure piece arrangement 10. In FIG. 1, the distance or pitch I results as a gap between the two outer pressure pieces 12. The pressure piece height h (measured perpendicularly with respect to the running direction/longitudinal axis 18) of the (outer) pressure pieces 12 is also well known for characterizing the link plate/pressure piece arrangement 10.

Furthermore, per pressure piece 12, FIG. 1 shows two (imaginary) circles 36, 38 which are adapted to the arcuate outer sections 28, 30, with a respective center point 40. A spacing a (determined perpendicularly with respect to the running direction or longitudinal axis 18) of the center points 40 of the two circles 36, 38 which are adapted to the arcuate outer sections 28, 30 results for the outer pressure piece 12 of each of the two joints 24, 26.

The ratio $V_1$ of the distance (known as the pitch I) between the two joints 24, 26 which are arranged behind one another to the spacing a (determined perpendicularly with respect to the longitudinal axis) of the center points 40 of the circles which are adapted to the arcuate outer sections is $V_1 = I/a \leq 2.4$, and the ratio $V_2$ of the pressure piece height h (determined perpendicularly with respect to the running direction) of the (outer) pressure pieces 12 to the spacing a (determined perpendicularly with respect to the running direction) of the center points 40 is $V_2 = h/a \leq 1.7$.

Figure 2:
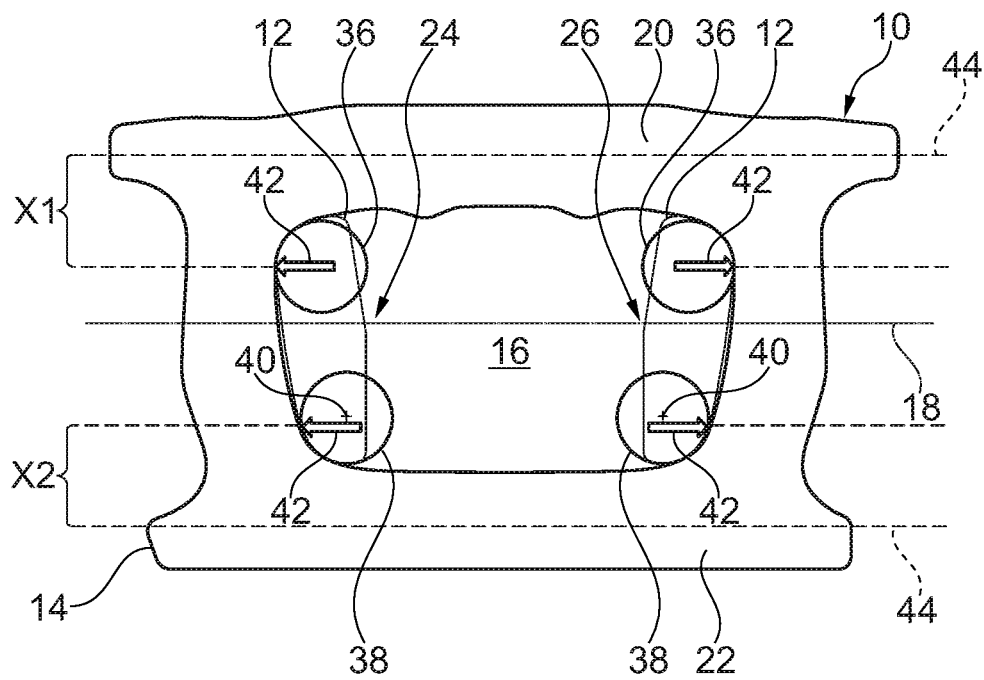
FIG. 2 shows link plate and pressure piece parameters of the link plate and the pressure pieces of the link plate/pressure piece arrangement.

FIG. 2 shows further parameters of the pressure pieces 12 and the link plate 14 of the link plate/pressure piece arrangement 10. It is shown, in particular, that the introduction of force (arrow 42) into the link plate 14 takes place very far to the outside, in relation to the longitudinal axis 18. This results in relatively small distances X1 and X2 between the introduction points and the corresponding center axes 44 of the link plate longitudinal brackets 20, 22. The center axes 44 coincide broadly with the respective neutral fiber of the link plate longitudinal brackets 20, 22.

Component calculations in accordance with the finite element method (FEM) have shown that the flexural loading of the pressure pieces 12 which are configured in this way is reduced on account of an increased section modulus. Here, the pressure piece height h and the spacing a of the center point coordinates of the contact radii of both arcuate outer sections 28, 30, in each case in relation to the pitch I as a reference, are increased in comparison with known values of the parameters in such a way that the conditions result for the ratios $V_1$ and $V_2$. The increase brings about a small lever arm in the link plate 14, and a simultaneous reduction in the bending moment in the link plate longitudinal bracket 20, 22, as shown in FIG. 2. Therefore, the ratio $V_1$ between the pitch I and the vertical spacing of the center point coordinates a of both contact radii should be ≤2.4, and the ratio $V_2$ between said vertical spacing and the height h of the pressure piece should be ≤1.7.

Figure 3:
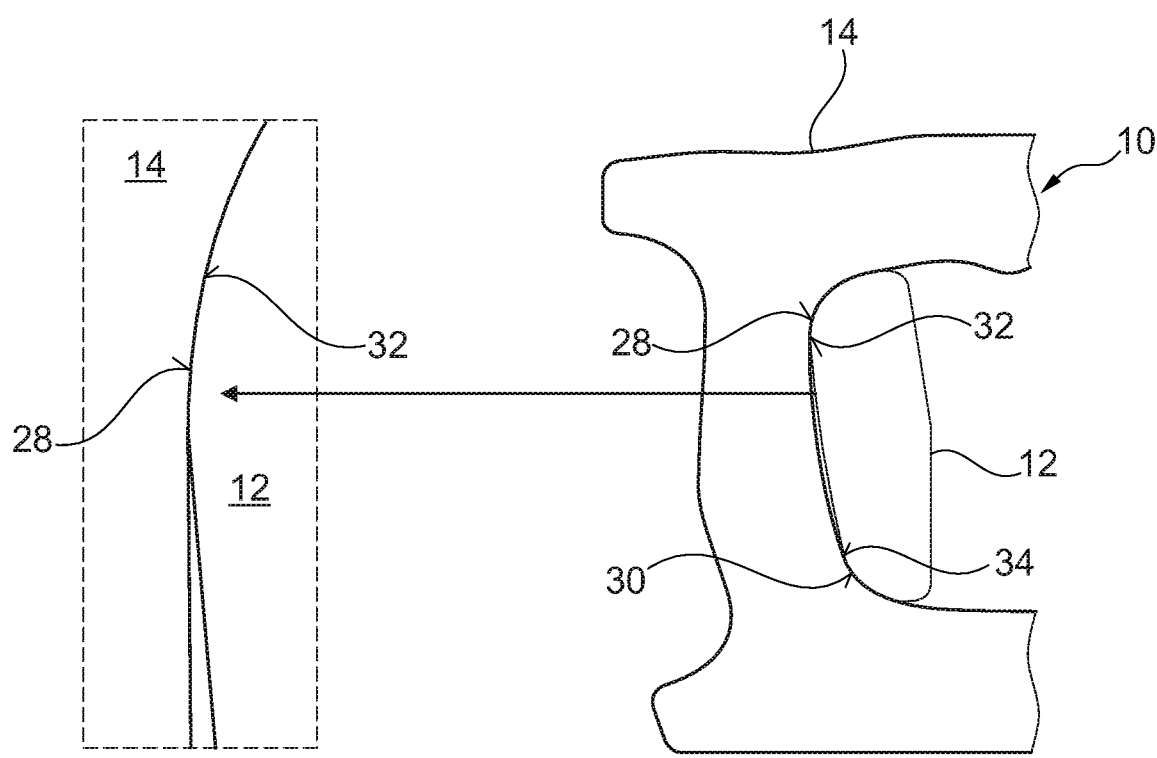
FIG. 3 shows an enlarged view of a portion of the link plate/pressure piece arrangement.

FIG. 3 shows further aspects and/or features of the link plate/pressure piece arrangement 10, namely the resulting anti-rotational resistance of the pressure piece 12 in the link plate 14. In the case of known link plate/pressure piece arrangements 10, the anti-rotational resistance has been ensured by way of the introduction of an S-bend (convex/concave transition) on the profile of the pressure piece 12 and the link plate inner contour (not shown). The S-bend has been dispensed with in the case of the design of the pressure pieces 12 and link plates 14 according to embodiments disclosed herein. In accordance with embodiments of the present disclosure, the anti-rotational resistance is ensured via the contact faces 28, 32; 30, 34. The stress distribution in the link plate 14 decreases according to the FEM calculation as a result of the omission of the S-bend in the pressure piece profile and as a result of increasing the contact radius in the case of the arcuate outer sections 28, 30 of the pressure pieces 12 and the corresponding edge sections 32, 34 of the link plate 14.

As a result of the omission of the S-bend for the anti-rotational resistance, it is possible to construct the pressure pieces 12 only with convex radii. The following advantages are produced as a result:
- fewer notch radii as a result of exclusively convex radii, improved stress distribution in the link plate;
- simple production;
- simple machining;
- improved stress distribution in the link plate 14 as a result of a greater contact radius on the pressure piece 12 and on the link plate 14; and
- higher section moduli of the pressure piece 12.

Furthermore, the following further properties of the resulting belt means arise:

On longitudinal sides of the belt means which lie opposite one another in the longitudinal direction of the pressure pieces 12, the pressure pieces 12 protrude in each case with end sections out of the arrangement of the link plates 14. On the end sections, the belt means has securing devices (not shown) for captively securing the link plates 14 and/or pressure pieces 12.

The resulting belt means is configured to transmit forces and torques in a cone pulley belt drive transmission (not shown), a cone pulley belt drive transmission of this type being arranged, for example, in the drive train of a motor vehicle between a drive machine and the driven axle. The continuously variable transmission adapts the transmission ratio to the respective driving conditions and operating conditions of the drive machine and/or to the requirements made by the driver of the drive machine, for example on the basis of an accelerator pedal actuation.

Within the cone pulley belt drive transmission, the belt means connects two cone pulley pairs or cone pulley sets in the power flow or torque flow, it being possible for a transmission ratio change to be realized and controlled in a targeted manner by way of a variation in the running radius of the belt means in relation to the axis of the respective cone pulley pairs. This can be controlled in a targeted manner by means of a control unit. The one cone pulley pair of the transmission is connected or can be connected at least to a transmission input shaft, and the other cone pulley pair is connected or can be connected to an output shaft of the transmission.

LIST OF REFERENCE NUMBERS

10 Link plate/pressure piece arrangement
12 Pressure piece
14 Link plate
16 Opening
18 Longitudinal axis (link plate)
20 Link plate longitudinal bracket
22 Link plate longitudinal bracket
24 Joint
26 Joint
28 Outer section, arcuate
30 Outer section, arcuate
32 Edge section
34 Edge section
36 Circle
38 Circle
40 Center point
42 Arrow
44 Center axis (link plate longitudinal bracket)
I Pitch
a Spacing
h Pressure piece height
x1 Distance
x2 Distance

The invention claimed is:

1. A plate link chain for a continuously variable transmission of a motor vehicle, comprising:
   a running direction;
   a link plate arranged parallel to the running direction and including an opening with a first edge section and a second edge section;
   a first pressure piece, oriented transversely with respect to the running direction to form a portion of a first articulated connection together with the link plate, the first pressure piece comprising:
      a first arcuate outer section, supported on the first edge section, and including a first center;
      a second arcuate outer section, supported on the first edge section, and including a second center;
      a first side, perpendicular to the running direction, for forming a first joint; and
      a height (h) measured perpendicular to the running direction;
   a second pressure piece, oriented transversely with respect to the running direction to form a portion of a second articulate connection together with the link plate, the second pressure piece comprising:
      a third arcuate outer section supported on the second edge section;
      a fourth arcuate outer section supported on the second edge section; and,
      a second side, perpendicular to the running direction, for forming a second joint behind the first joint in the running direction;
   a distance (I) between the first side and the second side;
   a spacing (a) between the first center and the second center measured perpendicular to the running direction;
   wherein:
      a first ratio $(V1)=I/a \leq 2.4$; and
      a second ratio $(V2)=h/a \leq 1.7$.

2. The plate link chain of claim 1, wherein respective contours of the first pressure piece and the second pressure piece include only convex radii.

3. The plate link chain of claim 1, wherein an introduction of force from the first pressure piece into the link plate takes place in a region of the first edge section lying outside of the first center or the second center.

4. The plate link chain of claim 1, wherein convex radii of the arcuate outer sections are of identical magnitude.

5. The plate link chain of claim 1, wherein the opening is of a slot configuration and includes a longitudinal axis parallel to the running direction.

6. The plate link chain of claim 1, wherein the link plate is comprised of two link plate longitudinal brackets that extend on both sides of the opening parallel to a longitudinal axis of the link plate.

7. The plate link chain of claim 6 further comprising two link plate lateral brackets that extend on both sides of the opening perpendicular to the longitudinal axis of the link plate, wherein each link plate longitudinal bracket comprises first and second distal ends extending beyond a respective link plate lateral bracket.

8. The plate link chain of claim 6 wherein each link plate longitudinal bracket comprises a center axis aligned with a neutral fiber of the link plate longitudinal bracket.

9. The plate link of claim 1, wherein a profile of the first pressure pi piece and a contour of the first edge section does not include a convex and concave transition.

10. The plate link chain of claim 1, wherein a contour of the first pressure piece includes only convex radii.

11. The plate link chain of claim 1, wherein a profile of the first pressure piece and a contour of the first edge section does not include an S-bend.

* * * * *